United States Patent
Fujieda (10) Patent No.: US 8,079,124 B2
(45) Date of Patent: Dec. 20, 2011

(54) POST-CURE INFLATOR, RIM EXCHANGE METHOD OF THE SAME AND RIM

(75) Inventor: Yasuhiko Fujieda, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 549 days.

(21) Appl. No.: 12/274,729

(22) Filed: Nov. 20, 2008

(65) Prior Publication Data

US 2009/0155399 A1  Jun. 18, 2009

(30) Foreign Application Priority Data

Dec. 12, 2007  (JP) ................. 2007-320320

(51) Int. Cl.
*B29C 35/16* (2006.01)

(52) U.S. Cl. ............ 29/401.1; 29/428; 264/502; 425/3; 425/58.1

(58) Field of Classification Search ................ 425/3, 36, 425/58.1; 264/502, 237, 348; 29/401.1, 29/428

See application file for complete search history.

(56) References Cited

U.S. PATENT DOCUMENTS

| | | | | |
|---|---|---|---|---|
| 3,015,845 A | * | 1/1962 | Duerksen | 425/36 |
| 3,074,109 A | * | 1/1963 | Duerksen | 425/36 |
| 4,169,698 A | * | 10/1979 | Turk et al. | 425/58.1 |
| 5,352,104 A | * | 10/1994 | Ichikawa et al. | 425/58.1 |
| 5,441,393 A | | 8/1995 | Fujieda et al. | |

FOREIGN PATENT DOCUMENTS

| | | |
|---|---|---|
| JP | 51-61582 | 5/1976 |
| JP | 5-131463 | 5/1993 |
| JP | 2799256 | 7/1998 |

OTHER PUBLICATIONS

U.S. Appl. No. 12/983,470, filed Jan. 3, 2011, Fujieda, et al.
Korean Office Action dispatch Sep. 29, 2010, in Korean Patent Application No. 10-2008-123720 (with English translation).

\* cited by examiner

*Primary Examiner* — James Mackey
(74) *Attorney, Agent, or Firm* — Oblon, Spivak, McClelland, Maier & Neustadt, L.L.P.

(57) ABSTRACT

In a post-cure inflator of the present invention, a rim of a pair of disk shape rims for sandwiching bead portions of a tire has one rim surface and the other rim surface in which a plurality of step portions corresponding to the bead portions of different bead diameters are formed so as to reduce thickness from a center to an outer periphery. A pair of the rims is supported switchably between arrangement in which the one rim surfaces face each other and arrangement in which the other rim surfaces face each other. By such a configuration, it is possible to favorably sandwich the tire even when the bead diameter to be treated is added.

9 Claims, 7 Drawing Sheets

POST-CURE INFLATOR, RIM EXCHANGE METHOD OF THE SAME AND RIM

BACKGROUND OF THE INVENTION

1. Field of the Invention

The present invention relates to a post-cure inflator for performing expansion cooling to a vulcanized tire, a rim exchange method thereof and a rim.

2. Description of the Related Art

Conventionally, in a post-cure inflator, in a state that the air is enclosed into a vulcanized tire and a shape is properly retained, the tire is cooled to a temperature at which contraction of a reinforcement fiber is settled such as 100 degrees or less or 80 degrees or less.

Japanese Patent Laid-Open No. Sho51-61582 discloses a post inflator device of two cycles having upper and lower rims on the upper side and the lower side of a laterally installed center frame respectively, in which a tire released from a vulcanizer is sandwiched by the upper and lower rims positioned on the lower side of the center frame so as to perform expansion cooling, at the time, the upper and lower rims already positioned on the lower side of the center frame are positioned on the upper side of the center frame by 180 degree rotation of the center frame so as to continue the expansion cooling, and the upper and lower rims positioned on the upper side of the center frame so as to perform the expansion cooling of the tire are positioned on the lower side of the center frame so as to release the tire to which the expansion cooling is completed and receive a new tire. Then, the upper and lower rims are exchanged in accordance with a bead diameter or bead width of the tire to which the expansion cooling is performed.

Japanese Patent No. 2799256 discloses a post-cure inflator for performing expansion cooling of a tire at two cycles as well, in which a lower rim is sidable in the direction orthogonal to the axial direction, the lower rim slid to a position apart from a center axis of upper and lower rims receives the tire released from a vulcanizer and returns to a position corresponding to the center axis of the upper and lower rims, then the lower rim is brought closer to the upper rim in the axial direction, and the tire is sandwiched by the upper and lower rims and the expansion cooling is performed so that centering to the lower rim of the tire can be surely performed and an increase in size can also be prevented, and a conveyance device thereto. Since the lower rim is a sliding type, the upper and lower rims are easily exchanged.

Japanese Patent Laid-Open No. Hei5-131463 discloses post-cure inflator upper and lower rims for performing expansion cooling of a tire at two cycles as well capable of sandwiching tires in various sizes without exchanging an upper rim by providing differences in a steps shape having at least two outer diameters or more in the upper rim, and an upper and lower rim exchange device.

In tires on the market in recent years, bead diameters approximately from 12 inches to 24 inches are adopted in accordance with a type of an automobile to which the tires are installed. Even when the bead diameter is the same, a plurality of bead width are standardized. Therefore, in Japanese Patent Laid-Open No. Sho51-61582 and Japanese Patent No. 2799256, there is a need for selecting and exchanging rims for every type of the tires to which the expansion cooling is performed and further adjusting a rim clearance.

At this point, in Japanese Patent Laid-Open No. Hei5-131463, the tire of various bead diameters can be sandwiched without exchanging the rims. However, when the number of steps is increased so as to add a bead diameter to be treated, width of the step is narrowed and bead portions of the tires cannot be surely sealed. When the number of steps is increased so as to add the bead diameter to be treated, thickness of the rims is increased and a pair of the rims is not easily sufficiently brought closer to each other. That is, the tire with a larger bead diameter and narrower bead width is not easily sandwiched by a pair of the rims.

SUMMARY OF THE INVENTION

It is an object of the present invention to provide a post-cure inflator capable of favorably sandwiching a tire even when a bead diameter to be treated is added, a rim exchange method thereof and a rim.

A post-cure inflator of the present invention is a post-cure inflator for performing expansion cooling to a vulcanized tire having bead portions of various bead diameters and bead width, comprises a pair of disk shape rims having rim surfaces for sandwiching the bead portions of the tire on both sides, and a rim support mechanism for detachably supporting a pair of the rims, wherein in the rim of a pair of the rims, a plurality of step portions corresponding to the bead portions of different bead diameters are formed on one rim surface and the other rim surface so as to reduce thickness from a center to an outer periphery, and the rim support mechanism supports a pair of the rims switchably between arrangement in which the one rim surfaces face each other and arrangement in which the other rim surfaces face each other.

According to the above configuration, a pair of the rims for sandwiching the bead portions of the tire is supported switchably between the arrangement in which the one rim surfaces face each other and the arrangement in which the other rim surfaces face each other. Then, in the case where a pair of the rims is supported in the arrangement in which the one rim surfaces face each other, it is possible to sandwich the tire with the bead diameter corresponding to any of the step portions of the one rim surface. Meanwhile, in the case where a pair of the rims is supported in the arrangement in which the other rim surfaces face each other, it is possible to sandwich the tire with the bead diameter corresponding to any of the step portions of the other rim surface. As mentioned above, a plurality of the step portions corresponding to the bead portions of different bead diameters are formed on the one rim surface and the other rim surface of the rim respectively. The bead diameter to be treated is added by appropriately using the one rim surface and the other rim surface. Thereby, in comparison to the case where a number of step portions are provided in only one side of the rim so as to add the bead diameter to be treated, it is possible to have wider width of the step portions and surely seal the bead portions of the tire. Alternatively, a plurality of the step portions corresponding to the bead portions of different bead diameters are formed on the one rim surface and the other rim surface of the rim so as to add the bead diameter to be treated. Thereby, in comparison to the case where a number of step portions are provided in only one side of the rim so as to add the bead diameter to be treated, it is possible to sufficiently bring the step portions with a large bead diameter of a pair of the rims closer to each other. Therefore, it is possible to favorably sandwich the tire even when the bead diameter to be treated is added.

In the post-cure inflator of the present invention, the rim support mechanism may comprise a first attachment member to which one rim of a pair of the rims is attached, a second attachment member to which the other rim of a pair of the rims is attached, and further, a guide mechanism for guiding the other rim attached to the second attachment member to the first attachment member from which the one rim is already detached. According to the above configuration, the other rim attached to the second attachment member is guided to the first attachment member from which the one rim is already detached by the guide mechanism. Thereby, an up and down relationship between a pair of the rims can be switched by the procedure of detaching the one rim from the first attachment member, guiding the other rim attached to the second attachment member to the first attachment member by the guide mechanism, detaching this from the second attachment member and attaching this to the first attachment member, and attaching the one rim to the second attachment member which is empty. Therefore, it is possible to change a pair of the rims from the arrangement in which the one rim surfaces face each other to the arrangement in which the other rim surfaces face each other or vice versa without reversing the rims.

The post-cure inflator of the present invention may further comprise a first attachment and detachment mechanism for detaching the one rim attached to the first attachment member while attaching the other rim to the first attachment member which is empty, a second attachment and detachment mechanism for detaching the other rim attached to the second attachment member while attaching the one rim to the second attachment member which is empty, a conveyance device for conveying the one rim already detached from the first attachment member to the exterior and conveying the one rim already conveyed to the exterior to the second attachment member which is empty, and a control device for controlling the first attachment and detachment mechanism, the second attachment and detachment mechanism and the conveyance device. According to the above configuration, the first attachment and detachment mechanism, the second attachment and detachment mechanism and the conveyance device are controlled by the control device. Thereby, the one rim detached from the first attachment member by the first attachment and detachment mechanism is conveyed to the exterior by the conveyance device. Then, the other rim attached to the second attachment member is guided to the first attachment member by the guide mechanism. Thereby, the detachment from the second attachment member by the second attachment and detachment mechanism and the attachment to the first attachment member by the first attachment and detachment mechanism are performed. The one rim already conveyed to the exterior is conveyed to the second attachment member which is empty by the conveyance device and attached to the second attachment member by the second attachment and detachment mechanism. Therefore, it is possible to automatically perform an operation of changing a pair of the rims from the arrangement in which the one rim surfaces face each other to the arrangement in which the other rim surfaces face each other or vice versa.

In the post-cure inflator of the present invention, the first attachment and detachment mechanism may be a breach lock mechanism. According to the above configuration, it is possible to surely and easily perform the detachment of the rims from the first attachment member and the attachment of the rims to the first attachment member by the breach lock mechanism.

In the post-cure inflator of the present invention, the second attachment and detachment mechanism may have a permanent magnet. According to the above configuration, it is possible to surely and easily perform the detachment of the rims from the second attachment member and the attachment of the rims to the second attachment member by utilizing absorption force of the permanent magnet.

The post-cure inflator of the present invention may further comprise a clearance adjustment mechanism for adjusting a clearance between a pair of the rims, and a clearance adjustment control device for controlling the clearance adjustment mechanism. According to the above configuration, since the clearance between a pair of the rims is automatically adjusted by the clearance adjustment mechanism controlled by the clearance adjustment control device, it is possible to simplify a rim clearance adjustment operation.

A rim exchange method of a post-cure inflator of the present invention is a rim exchange method of a post-cure inflator for performing expansion cooling to a vulcanized tire having the bead portions of various bead diameters and bead width by sandwiching the bead portions with a pair of disk shape rims having rim surfaces on both sides, wherein a pair of the rims in which a plurality of step portions corresponding to the bead portions of different bead diameters are respectively formed on one rim surface and the other rim surface so as to reduce thickness from a center to an outer periphery are supported switchably between arrangement in which the one rim surfaces face each other and arrangement in which the other rim surfaces face each other, the method comprises detaching one rim attached to the first attachment member and conveying the rim to the exterior, guiding the other rim attached to the second attachment member to the first attachment member so as to perform detachment from the second attachment member and attachment to the first attachment member, and attaching the one rim already conveyed to the exterior to the second attachment member which is empty so as to change the arrangement in which the one rim surfaces face each other to the arrangement in which the other rim surfaces face each other or vice versa.

According to the above configuration, a pair of the rims for sandwiching the bead portions of the tire are supported switchably between the arrangement in which the one rim surfaces face each other and the arrangement in which the other rim surfaces face each other. In the case where a pair of the rims is supported in the arrangement in which the one rim surfaces face each other, it is possible to sandwich the tire with the bead diameter corresponding to any of the step portions of the one rim surface. Meanwhile, in the case where a pair of the rims is supported in the arrangement in which the other rim surfaces face each other, it is possible to sandwich the tire with the bead diameter corresponding to any of the step portions of the other rim surface. As mentioned above, a plurality of the step portions corresponding to the bead portions of different bead diameters are formed on the one rim surface and the other rim surface of the rim respectively. And the bead diameter to be treated is added by appropriately using the one rim surface and the other rim surface. Thereby, in comparison to the case where a number of step portions are provided in only one side of the rim so as to add the bead diameter to be treated, it is possible to have wider width of the step portions and surely seal the bead portions of the tire. Alternatively, a plurality of the step portions corresponding to the bead portions of different bead diameters are formed on the one rim surface and the other rim surface of the rim so as to add the bead diameter to be treated. Thereby, in comparison to the case where a number of step portions are provided in only one side of the rim so as to add the bead diameter to be treated, it is possible to sufficiently bring the step portions with a large bead diameter of a pair of the rims closer to each other. Therefore, it is possible to favorably sandwich the tire even when the bead diameter to be treated is added.

The up and down relationship between a pair of the rims can be switched by the procedure of detaching the one rim from the first attachment member and conveying the one rim to the exterior, guiding the other rim attached to the second attachment member to the first attachment member, performing the detachment from the second attachment member and the attachment to the first attachment member, and attaching the one rim already conveyed to the exterior to the second attachment member which is empty. Therefore, it is possible to change a pair of the rims from the arrangement in which the one rim surfaces face each other to the arrangement in which the other rim surfaces face each other or vice versa without reversing the rims.

A rim of the present invention is a rim to be attached to either a first attachment member or a second attachment member provided in a post-cure inflator for performing expansion cooling to a vulcanized tire having bead portions of various bead diameters and bead width and to be formed into a disk shape having rim surfaces abutted to the bead portions on both sides, including one rim surface and the other rim surface in which a plurality of step portions corresponding to the bead portions of different bead diameters are formed so as to reduce thickness from a center to an outer periphery, and having a first engagement portion engaged with the first attachment member and a second engagement portion engaged with the second attachment member.

According to the above configuration, the rim having the one rim surface and the other rim surface is attached to either the first attachment member or the second attachment member provided in the post-cure inflator. In the case where a pair of the rims is attached to the post-cure inflator so as to have the arrangement in which the one rim surfaces face each other, it is possible to sandwich the tire with the bead diameter corresponding to any of the step portions of the one rim surface. Meanwhile, in the case where a pair of the rims is attached to the post-cure inflator so as to have the arrangement in which the other rim surfaces face each other, it is possible to sandwich the tire with the bead diameter corresponding to any of the step portions of the other rim surface. As mentioned above, a plurality of the step portions corresponding to the bead portions of different bead diameters are formed on the one rim surface and the other rim surface of the rim respectively. The bead diameter to be treated is added by appropriately using the one rim surface and the other rim surface. Thereby, in comparison to the case where a number of step portions are provided in only one side of the rim so as to add the bead diameter to be treated, it is possible to have wider width of the step portions and surely seal the bead portions of the tire. Alternatively, a plurality of the step portions corresponding to the bead portions of different bead diameters are formed on the one rim surface and the other rim surface of the rim so as to add the bead diameter to be treated. Thereby, in comparison to the case where a number of step portions are provided in only one side of the rim so as to add the bead diameter to be treated, it is possible to sufficiently bring the step portions with a large bead diameter of a pair of the rims closer to each other. Therefore, it is possible to favorably sandwich the tire even when the bead diameter to be treated is added.

DESCRIPTION OF THE PREFERRED EMBODIMENTS

Hereinafter, a description will be given to a post-cure inflator according to the present invention based on the drawings. It should be noted that a description will be given to the case of a post-cure inflator of two cycles in which expansion cooling is performed to a tire on the upper side and the lower side of a laterally installed center frame.

(Mechanical Configuration of Post-cure Inflator 100)

Figure 1:
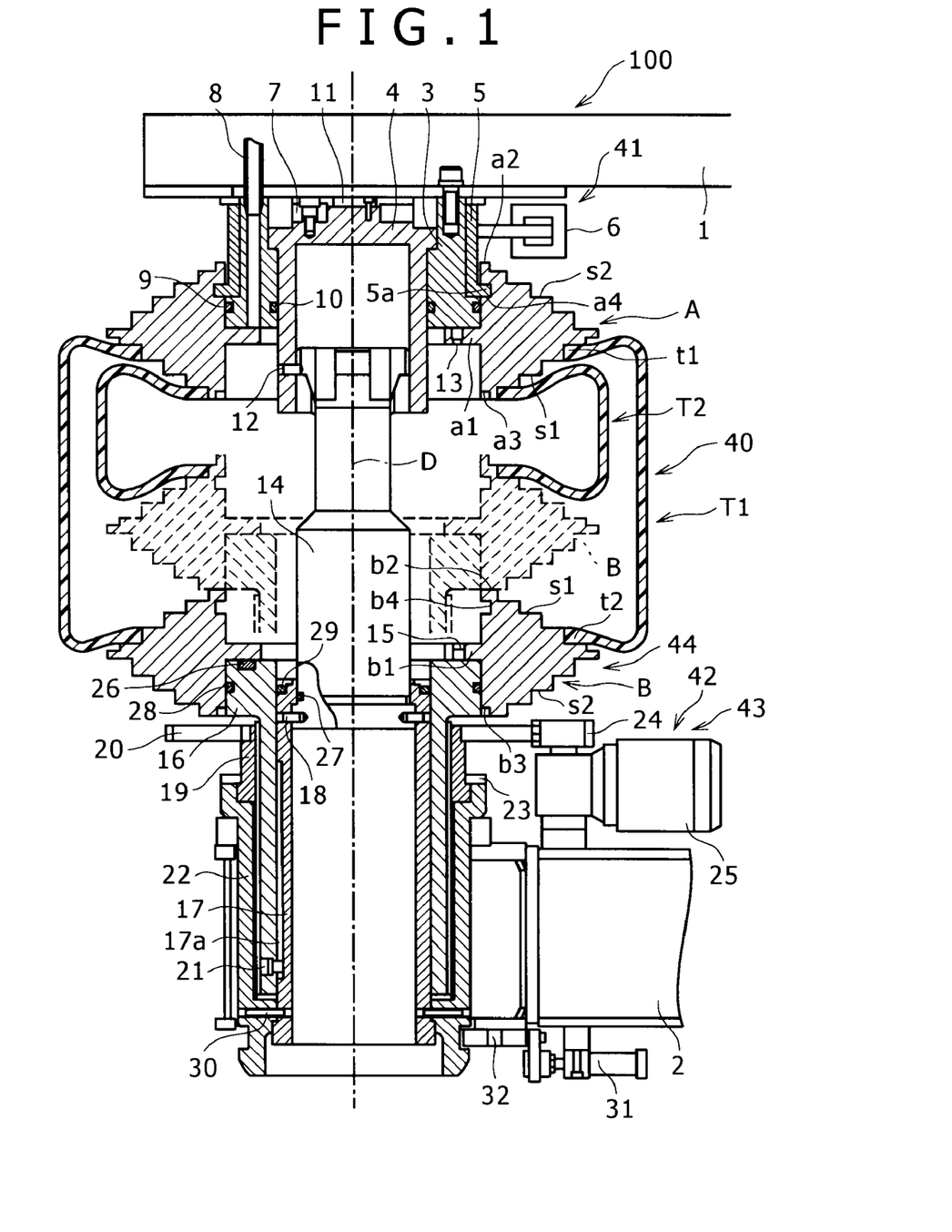
FIG. 1 is a major part sectional view showing a state that a vulcanized tire is attached to a post-cure inflator.

FIG. 1 is a major part sectional view showing a state that a vulcanized tire T1 is attached to a post-cure inflator 100 according to the present embodiment. It should be noted that in FIG. 1, a tire T2 is a smallest tire capable of being used in this post-cure inflator 100 as a reference. In this case, since bead width is narrow as well, a pair of rims A and B (an upper rim A and a lower rim B) are brought closest to each other.

The post-cure inflator 100 has a center frame 1 in the center. The post-cure inflator 100 has a rim support mechanism 40 for detachably supporting a pair of the rims A and B on the upper side and the lower side of the center frame 1.

The rim support mechanism 40 is fixed to the center frame 1 by a bolt and has an upper rim support 3 serving as a first attachment member to which the upper rim A is attached and a lower rim support 16 raised and lowered by a guide mechanism 43 described later and serving as a second attachment member to which the lower rim B is attached.

The upper rim support 3 has a cylindrical shape. A supply pipe 8 for supplying and discharging the high pressure air for expanding the tire T1 is provided in a cylinder part of the upper rim support 3. An inner periphery part of the upper rim A constituting a pair of the rims for sealing a bead portions t1 of the tire T1 is fitted with an outer periphery part of the upper rim support 3. A ring shape fixing seal 9 for sealing the high pressure air enclosed into the tire T1 is provided between the upper rim support 3 and the upper rim A.

The upper rim A is a magnetic body formed into a disk shape and has a rim surface (one rim surface) s1 on the lower side and a rim surface (the other rim surface) s2 on the upper side respectively. A plurality of step portions corresponding to the bead portion t1 with a different bead diameter are formed on the two rim surfaces s1 and s2 respectively so as to reduce thickness from the center to an outer periphery. As shown in FIG. 1 for example, an inner diameter part of the bead portion t1 on the upper side of the tire T1 is fitted with a corresponding step portion of the rim surface s1. Since this bead portion t1 is abutted to a horizontal surface of the step portion with which the inner diameter part of the bead portion t1 is fitted, the high pressure air in the tire is sealed.

A protrusion a1 for retaining separating force at the time of enclosing the high pressure air is provided in an inner diameter part of the upper rim A. A hole (a first engagement portion) which is fitted with a guide pin 13 provided in the upper rim support 3 is provided in this protrusion a1 in order to position the upper rim A in the circumferential direction. It should be noted that this hole is fitted with a guide pin 15 provided in the lower rim support 16 when the upper rim A is attached to the lower rim support 16.

A breach lock mechanism 41 serving as a first attachment and detachment mechanism is provided in an outer diameter part of the upper rim support 3. The breach lock mechanism 41 has a rotatable lock ring 5 whose movement in the axial direction is regulated and an upper cylinder 6 for rotating this lock ring 5. The upper cylinder 6 is controlled by a control device 50 described later (refer to FIG. 5).

An upper part of the upper rim A is detachably connected to a lower part of the lock ring 5 by the breach lock mechanism 41. Specifically, a concave and convex portion 5a is formed in an outer diameter part of the lower part of the lock ring 5 by providing an equal cut in the circumferential direction. Meanwhile, a groove a4 fitted with the concave and convex portion 5a of the lock ring 5 is provided in the upper part of the upper rim A. A cut fitted with a convex part of the concave and convex portion 5a of the lock ring 5 is provided in an upper part of this groove a4. The upper rim A is abutted to the lock ring 5 at a position where the convex part of the concave and convex portion 5a of the lock ring 5 corresponds to the cut of the upper rim A, and the concave and convex portion 5a of the lock ring 5 is fitted with the groove a4 of the upper rim A. Then, since the lock ring 5 is rotated so that the convex part of the lock ring 5 does not correspond to the cut of the upper rim A, the upper rim A is connected to the lock ring 5.

Figure 2:
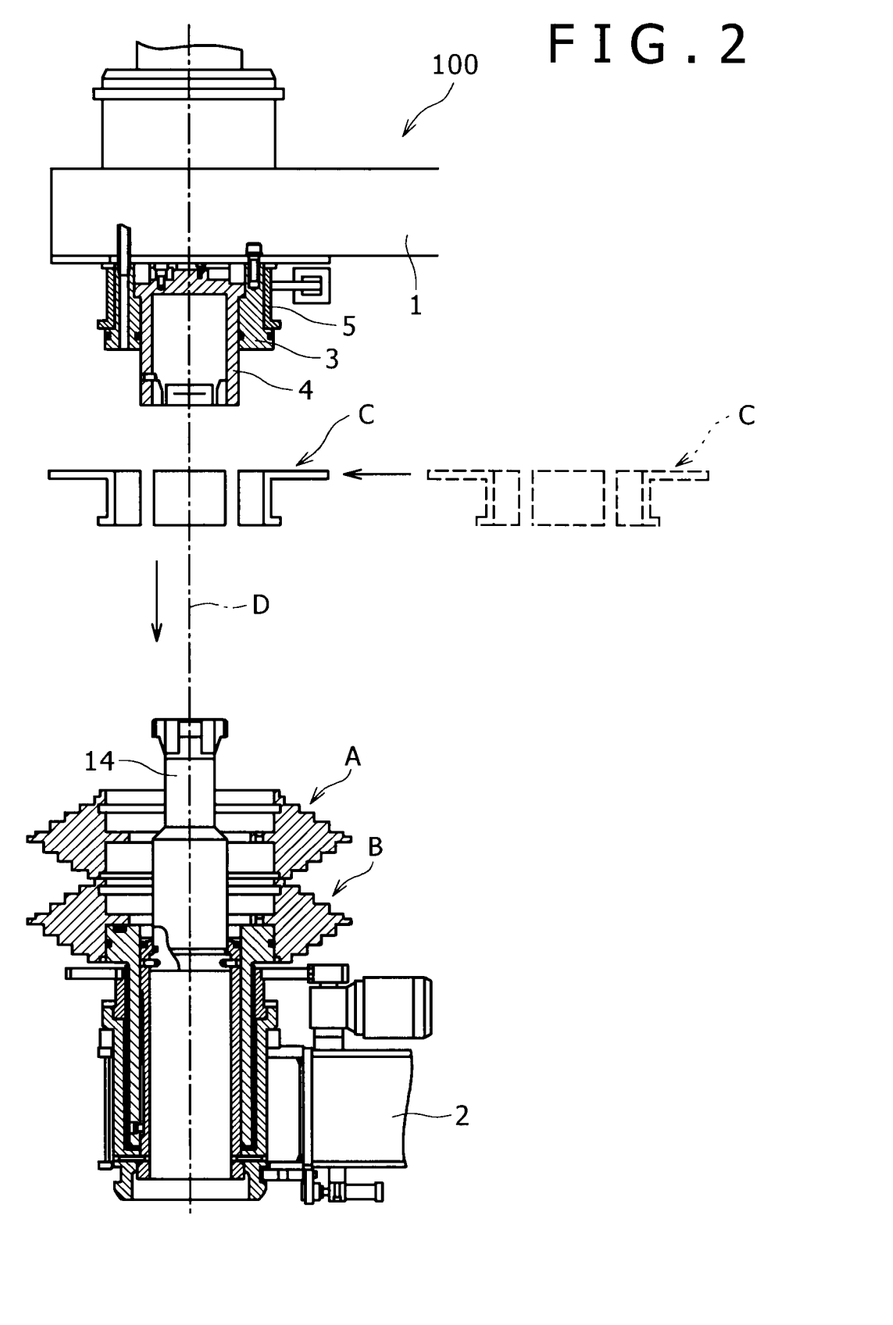
FIG. 2 is a major part sectional view showing a state of a rim exchange operation.
Figure 3:
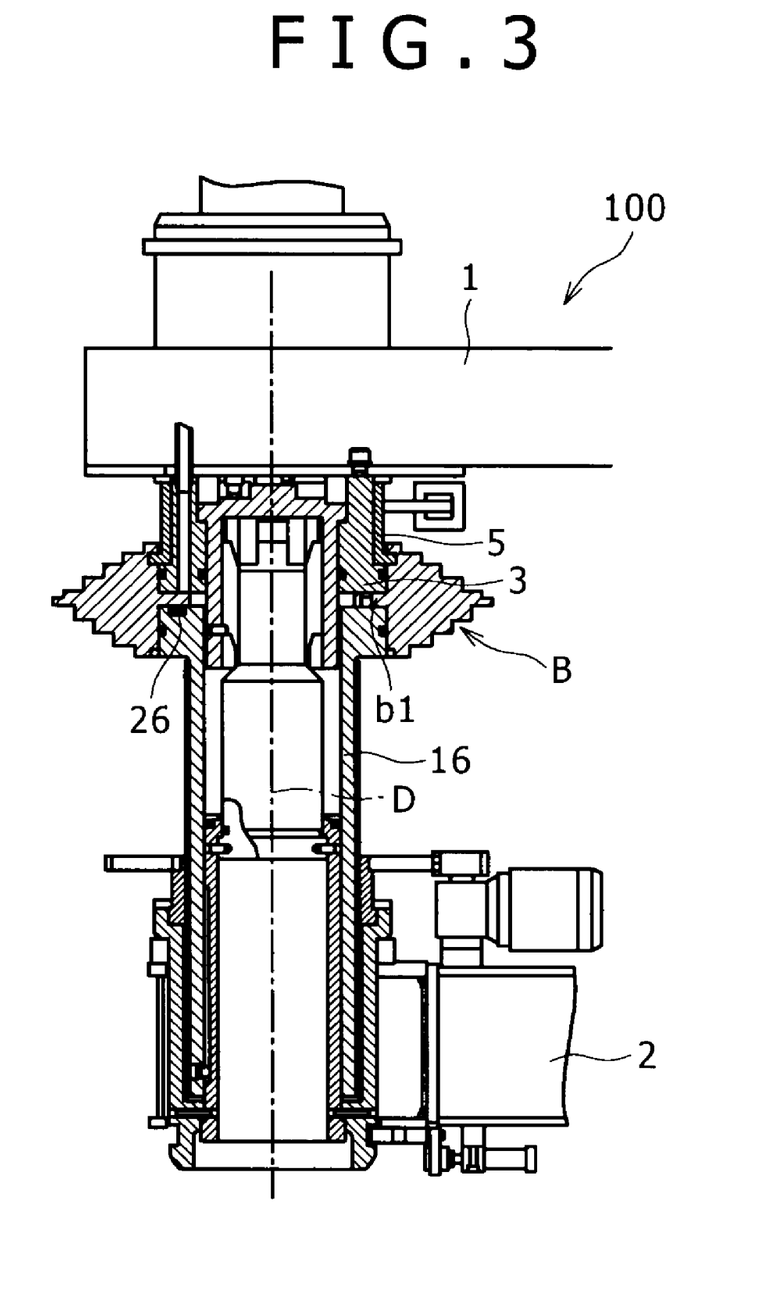
FIG. 3 is a major part sectional view showing the state of the rim exchange operation.

As mentioned above, the upper cylinder 6 is controlled by the control device 50. Since the upper cylinder 6 is controlled and the lock ring 5 is rotated in the unlocking direction, the breach lock mechanism for the rim fixed to the upper rim support 3 (the upper rim A in FIG. 1) and the lock ring 5 is set in an unlocked state. As shown in FIG. 2, the rim already detached from the upper rim support 3 (the upper rim A in FIG. 2) is once disposed on the rim fixed onto the lower rim support 16 described later (the lower rim B in FIG. 2) and then conveyed to the exterior by a conveyance device C. As shown in FIG. 3, since the upper cylinder 6 is controlled and the lock ring 5 is rotated in the locking direction, the breach lock mechanism for the rim abutted to the empty upper rim support 3 (the lower rim B in FIG. 3) and the lock ring 5 is set in a locked state.

As mentioned above, it is possible to surely and easily perform detachment of the rim from the upper rim support 3 and attachment of the rim to the upper rim support 3 by the breach lock mechanism.

As shown in FIG. 1, a lock member 4 is fitted with an inner diameter part of the upper rim support 3. This lock member 4 is rotated by a rotation bracket 7 which is rotated by a rotation mechanism 33 (not shown) controlled by the control device 50 in order for a lock action with a locking shaft 14 described later. A backing plate 11 for regulating movement of the lock member 4 in the axial direction is abutted to the lock member 4. A ring shape seal 10 for sealing the high pressure air enclosed into the tire T1 is provided between the upper rim support 3 and the lock member 4.

An upper part of the locking shaft 14 raised and lowered in the axial direction by a lift beam 2 described later is detachably connected to a lower part on the inner diameter side of the lock member 4 by a similar breach lock mechanism. A rotation stop pin 12 for fixing rotation of the locking shaft 14 at a lock position when connected to the locking shaft 14 is provided in the lock member 4. After the breach lock mechanism for the lock member 4 and the locking shaft 14 is set in an unlocked state, since the locking shaft 14 is lowered and the lock member 4 and the locking shaft 14 are brought apart from each other, the tire T1 can be disposed on the lower rim B.

The guide mechanism 43 is provided in a lower part of the post-cure inflator 100. The guide mechanism 43 has a lift beam cylinder 34 (not shown) for raising and lowering the lift beam 2 in the axial direction, and a clearance adjustment mechanism 42. The clearance adjustment mechanism 42 has an adjustment nut 19 fitted with an upper part of a nut receiving material 22 described later having a screw inside, a spur gear 20 fitted with an upper part of this adjustment nut 19, a pinion 24 engaged with the spur gear 20, and a gear motor 25 with a reducer for rotating the pinion 24. The pinion 24 and the gear motor 25 are attached to the lift beam 2. The lift beam cylinder 34 and the gear motor 25 are controlled by the control device 50. The lower rim support 16 is raised and lowered in the axial direction by this clearance adjustment mechanism 42. Specifically, drive of the gear motor 25 is controlled by the control device 50 so that the pinion 24 is rotated and the adjustment nut 19 is rotated through the spur gear 20. Thereby, the lower rim support 16 with which the adjustment nut 19 is screwed, movement of the lower rim support 16 in the rotational direction being regulated by a slide pin 21, is raised and lowered in the axial direction. The lift beam 2 and the lower rim support 16 are raised and lowered in the axial direction by the guide mechanism 43. Specifically, since the lift beam cylinder 34 is controlled by the control device 50, the lift beam 2 is raised and lowered in the axial direction and the lower rim support 16 is raised and lowered in the axial direction by the clearance adjustment mechanism 42.

As shown in FIG. 3, since the lift beam 2 and the lower rim support 16 are raised in the axial direction by the guide mechanism 43, the rim attached to the lower rim support 16 (the lower rim B in FIG. 3) is guided to the empty upper rim support 3.

As mentioned above, the rim attached to the lower rim support 16 is guided to the upper rim support 3 from which the other rim is already detached by the guide mechanism 43. Thereby, an up and down relationship between a pair of the rims A and B can be switched by the procedure of detaching the other rim from the upper rim support 3, guiding the rim attached to the lower rim support 16 to the upper rim support 3 by the guide mechanism 43, detaching this from the lower rim support 16 and attaching this to the upper rim support 3, and attaching the other rim already detached from the upper rim support 3 to the lower rim support 16 which is empty. Since the up and down relationship between a pair of the rims A and B is automatically switched by the control device 50, it is possible to simplify a rim exchange operation.

The post-cure inflator 100 has a detection device 36 (not shown) for detecting height of the lower rim support 16 (the advance amount relative to the nut receiving material 22). A detection result by the detection device 36 is inputted to the control device 50 serving as a clearance adjustment control device. A relationship between the bead diameter and the bead width, and the height of the lower rim support 16 is preliminarily inputted to a memory 52 (refer to FIG. 5) of the control device 50. A height position of the lower rim B based on the bead diameter and the bead width is determined by an arithmetic portion 51 (refer to FIG. 5) of the control device 50. Since the clearance adjustment mechanism 42 is controlled by the control device 50, the height of the lower rim support 16 is adjusted. Thereby, a rim clearance between the upper rim A and the lower rim B is adjusted. It should be noted that the rotation amount of the gear motor 25 can be used in a method of detecting the height of the lower rim support 16.

As mentioned above, since the rim clearance between a pair of the rims A and B is automatically adjusted, it is possible to reduce a burden due to a rim clearance adjustment operation and shorten loss time required for the rim clearance adjustment operation.

As shown in FIG. 1, the nut receiving material 22 is installed on the lift beam 2. The nut receiving material 22 is detachable from the lift beam 2 by a lower cylinder 31 and a lock plate 32. The lower cylinder 31 is controlled by the control device 50. A pressing plate 23 for regulating movement of the adjustment nut 19 in the axial direction is provided on the upper side of the nut receiving material 22.

A convex shape step is provided in the diameter reducing direction in a lower part on the inner diameter side of the nut receiving material 22. The nut receiving material 22 is coupled to the locking shaft 14 by a coupling shaft 17 having steps on the upper side and the lower side. Specifically, the nut receiving material 22 is coupled to a lower part of the coupling shaft 17 by a spring pin 30. An upper part of the coupling shaft 17 is connected to the locking shaft 14 by a pin 18. A groove 17a along the axial direction is provided in an outer diameter part of the coupling shaft 17. A front end of the slide pin 21 described later is inserted into the inside of this groove 17a. A ring shape seal 27 for sealing the high pressure air enclosed into the tire T1 is provided between the locking shaft 14 and the coupling shaft 17.

A lower cylinder of the lower rim support 16 having a threaded outer diameter part is screwed into an inner diameter part of the adjustment nut 19. As mentioned above, this lower rim support 16 is raised and lowered by the rotation of the adjustment nut 19. The slide pin 21 is attached to a lower part of the lower cylinder of the lower rim support 16. The front end of the slide pin 21 is inserted into the inside of the groove 17a of the coupling shaft 17. Thereby, rotation of the lower rim support 16 at the time of rotating the adjustment nut 19 is regulated. A ring shape seal 29 for sealing the high pressure air enclosed into the tire T1 is provided between the lower rim support 16 and the coupling shaft 17.

An inner diameter part of the lower rim B constituting a pair of the rims and sealing a bead portions t2 of the tire T1 is fitted with an outer diameter part of an upper part of the lower rim support 16. A ring shape seal 28 for sealing the high pressure air enclosed into the tire T1 is provided between the lower rim support 16 and the lower rim B.

The lower rim B is a magnetic body formed into a disk shape as well as the upper rim A and has a rim surface (one rim surface) s1 on the upper side and a rim surface (the other rim surface) s2 on the lower side respectively. A plurality of step portions corresponding to the bead portion t2 with a different bead diameter are formed on the two rim surfaces s1 and s2 respectively so as to reduce the thickness from the center to the outer periphery. The tire T1 released from a vulcanizer (not shown) is conveyed onto the lower rim B. As shown in FIG. 1 for example, an inner diameter part of the bead portion t2 on the lower side of the tire T1 is fitted with a corresponding step portion of the rim surface s1. Since this bead portions t2 is abutted to a horizontal surface of the step portion with which the inner diameter part of the bead portions t2 is fitted, the high pressure air in the tire is sealed.

A protrusion b1 for retaining the separating force at the time of enclosing the high pressure air is provided in an inner diameter part of the lower rim B as well as the upper rim A. A hole (a second engagement portion) which is fitted with the guide pin 15 provided in the lower rim support 16 is provided in this protrusion b1 in order to position the lower rim B in the rotational direction. It should be noted that this hole is fitted with the guide pin 13 provided in the upper rim support 3 when the lower rim B is attached to the upper rim support 3.

A groove b4 fitted with the lock ring 5 is provided in an upper part of the lower rim B as well as the upper rim A. Thereby, it is possible to connect the lock ring 5 and the lower rim B by the breach lock mechanism as described later.

Figure 4:
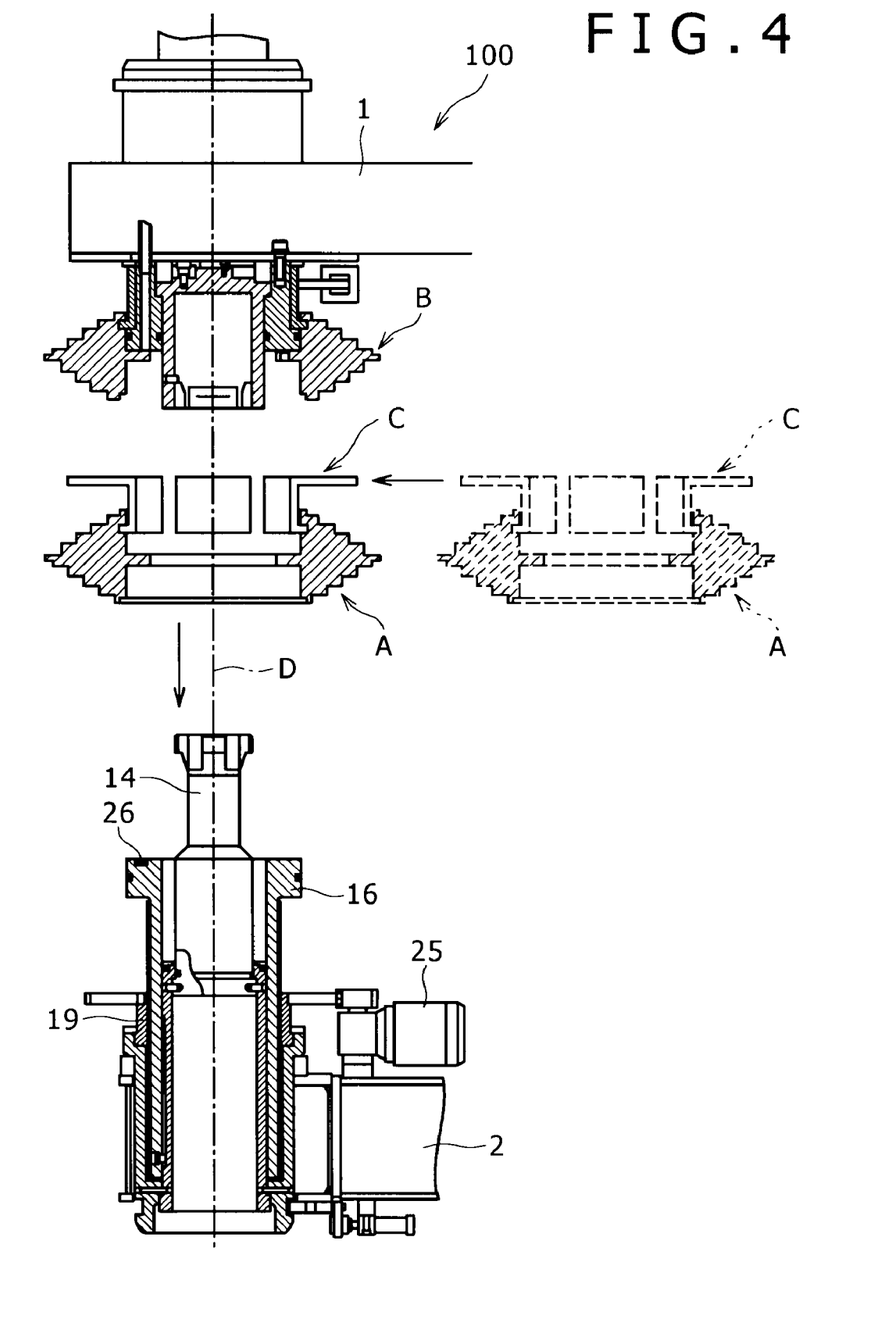
FIG. 4 is a major part sectional view showing the state of the rim exchange operation.

As shown in FIG. 2, the post-cure inflator 100 has the conveyance device C for conveying the vulcanized tire T1 onto the lower rim B. This conveyance device C is controlled by the control device 50. As shown in FIG. 2, in this conveyance device C, the breach lock mechanism for the lock ring 5 is set in an unlocked state and the upper rim A disposed on the lower rim B is conveyed to the exterior, and as shown in FIG. 4, and the upper rim A already conveyed to the exterior is conveyed onto the empty lower rim support 16. With regard to the conveyance device C, the upper rim A may be ensured by the breach lock mechanism mentioned above, or the upper rim A may be ensured by opening a claw whose diameter is reduced in the radial direction and engaging the claw with the inner diameter part of the upper rim A. It should be noted that a device for conveying the vulcanized tire T1 onto the lower rim B may be separated from a device for conveying the rim from and to the exterior.

As shown in FIG. 1, a second attachment and detachment mechanism 44 is provided between the lower rim support 16 and the lower rim B. The second attachment and detachment mechanism 44 is provided on an upper surface of the lower rim support 16 and has a plurality of permanent magnets 26 for fixing the lower rim B to the lower rim support 16 by absorption force and the guide mechanism 43 described above. As shown in FIG. 3, after the rim already guided to the upper rim support 3 by the lift beam 2 and the lower rim support 16 which are raised by the guide mechanism 43 (the lower rim B in FIG. 3) is fixed to the upper rim support 3 by the breach lock mechanism, when the lift beam 2 is lowered by the guide mechanism 43, the lower rim B already fixed to the lower rim support 16 is detached from the lower rim support 16 against the absorption force of the permanent magnets 26. As shown in FIG. 4, when the rim already conveyed by the conveyance device C (the upper rim A in FIG. 4) is disposed on the lower rim support 16, the upper rim A is fixed to the lower rim support 16 by the absorption force of the permanent magnets 26.

As mentioned above, by utilizing the absorption force of the permanent magnets 26, it is possible to surely and easily perform detachment of the rim from the lower rim support 16 and attachment of the rim to the lower rim support 16.

In the post-cure inflator 100 configured as above, the separating force on a pair of the rims due to internal pressure of the tire works on the breach lock mechanism for the upper rim A through the upper rim support 3 and the lock member 4 in an upper part and the breach lock mechanism for the lock member 4 and the locking shaft 14 through the lower rim support 16, the adjustment nut 19, the nut receiving material 22, the coupling shaft 17 and the locking shaft 14 in the lower part. Therefore, in this post-cure inflator 100, the separating force of the internal pressure of the tire does not work on the lift beam 2 and the center frame 1.

(Configuration of Rim)

Next, a detailed description will be given to a pair of the rims A and B. As shown in FIG. 1, a pair of the rims A and B is disposed such that the rim surface s1 provided on the lower side of the upper rim A and the rim surface s1 provided on the upper side of the lower rim B (the one rim surfaces s1) face each other. By switching the up and down relationship between a pair of the rims A and B, the arrangement can be switched to arrangement in which the rim surface s2 provided on the upper side of the upper rim A and the rim surface s2 provided on the lower ride of the lower rim B (the other rim surfaces s2) face each other.

In the present embodiment, the one rim surface s1 has a plurality of the step portions formed at two inch intervals corresponding to the bead portions with bead diameters of even-numbered inches. In an example of FIG. 1, the one rim surface s1 has four step portions respectively corresponding to the bead portions with bead diameters of 12, 14, 16 and 18 inches. In the present embodiment, the other rim surface s2 has a plurality of the step portions formed at two inch intervals corresponding to the bead portions with the bead diameter of odd-numbered inches. In the example of FIG. 1, the other rim surface s2 has four step portions respectively corresponding to the bead portions with bead diameters of 13, 15, 17 and 19 inches.

As shown in FIG. 1, in the case where a pair of the rims A and B is disposed such that the one rim surfaces s1 face each other, a pair of the rims A and B can sandwich any tire with the bead diameter of even-numbered inches (12, 14, 16 or 18). Meanwhile, in the case where a pair of the rims A and B is disposed such that the other rim surfaces s2 face each other, a pair of the rims A and B can sandwich any tire with the bead diameter of odd-numbered inches (13, 15, 17 or 19).

As mentioned above, a pair of the rims A and B for sandwiching the bead portions t1 and t2 of the tire are supported switchably between the arrangement in which the one rim surfaces s1 face each other and the arrangement in which the other rim surfaces s2 face each other. In the case where a pair of the rims A and B is supported in the arrangement in which the one rim surfaces s1 face each other, it is possible to sandwich the tire with the bead diameter corresponding to any of the step portions of the one rim surface s1. Meanwhile, in the case where a pair of the rims A and B is supported in the arrangement in which the other rim surfaces s2 face each other, it is possible to sandwich the tire with the bead diameter corresponding to any of the step portions of the other rim surface s2. As mentioned above, a plurality of the step portions corresponding to the bead portions of different bead diameters are formed on the one rim surface s1 and the other rim surface s2 of the rim respectively. The bead diameter to be treated is added by appropriately using the one rim surface s1 and the other rim surface s2. Thereby, in comparison to the case where a number of step portions are provided in only one side of the rim so as to add the bead diameter to be treated, it is possible to have wider width of the step portions and surely seal the bead portions of the tire. Alternatively, a plurality of the step portions corresponding to the bead portions of different bead diameters are formed on the one rim surface s1 and the other rim surface s2 of the rim so as to add the bead diameter to be treated. Thereby, in comparison to the case where a number of step portions are provided in only one side of the rim so as to add the bead diameter to be treated, it is possible to sufficiently bring the step portions with a large bead diameter of a pair of the rims A and B closer to each other. Therefore, it is possible to favorably sandwich the tire even when the bead diameter to be treated is added.

Convex portions a2 and b2 are provided in the upper part of a pair of the rims A and B and concave portions a3 and b3 are provided in the lower part of a pair of the rims A and B. These convex portions a2 and b2 and the concave portions b3 and b3 are formed so as to fit with each other. Specifically, the concave portion a3 of the upper rim A is fitted with the convex portion b2 of the lower rim B (refer to FIG. 2) and the concave portion b3 of the lower rim B is fitted with the convex portion a2 of the upper rim A.

It should be noted that although a pair of the rims A and B is formed by the magnetic body, a part absorbed by the permanent magnets 26 is formed by a magnetic material and the other parts may be formed by a non-magnetic material. In the case where the permanent magnets 26 are not used for the second attachment and detachment mechanism 44, a pair of the rims A and B may be formed by the non-magnetic material. For example when a pair of the rims A and B is formed by an aluminum alloy, it is possible to largely reduce weight.

(Configuration of Control Device 50)

Figure 5:
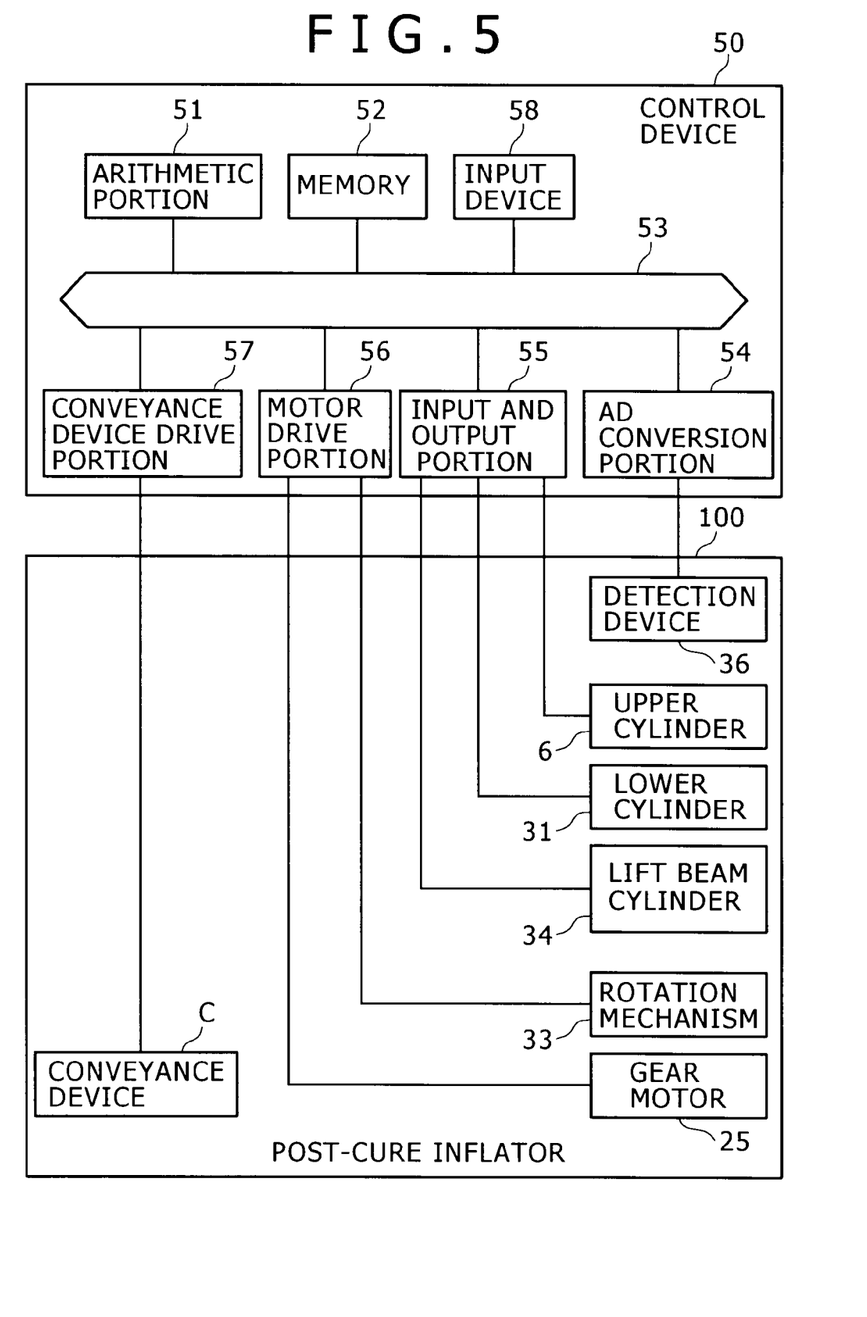
FIG. 5 is a block diagram of a control device.

An action of the post-cure inflator 100 configured as above is controlled by the control device 50 as shown in FIG. 5. The control device 50 is provided with the arithmetic portion 51 for executing various programs, the memory 52 for storing the various programs and data, an input device 58 operated to input by an operator, an input and output portion 55 connected to various cylinders 6, 31 and 34 of the post-cure inflator 100, a motor drive portion 56 for driving the gear motor 25 and the rotation mechanism 33, a conveyance device drive portion 57 for driving the conveyance device C, an AD conversion portion 54 connected to the detection device 36 and the like, and a signal bus 53 connected to the above members so as to communicate data bi-directionally.

The various programs such as an expansion cooling processing routine and a rim exchange processing routine described later are stored in the memory 52. The expansion cooling processing routine can be executed by the arithmetic portion 51. The control device 50 executes processing of sandwiching the bead portions t1 and t2 of the tire T1 or T2 with a pair of the rims A and B, and processing of performing the expansion cooling to the tire T1 or T2 sandwiched by a pair of the rims A and B and conveying the tire T1 or T2 to which the expansion cooling is already performed to the exterior. The rim exchange processing routine can be executed by the arithmetic portion 51. The control device 50 executes processing of guiding and attaching the rim fixed to the lower rim support 16 to the upper rim support 3 and attaching the rim already conveyed to the exterior to the lower rim support 16 which is empty after the rim fixed to the upper rim support 3 is detached and conveyed to the exterior, and processing of adjusting the rim clearance.

An input button, a numeric keypad and the like (not shown) are provided in the input device 58 so as to input the serial number, the type and the like of the tire. Specifically, data of the tire to which the expansion cooling is to be performed such as the tire serial number, the bead diameter, the bead width and the like are inputted to the input device 58. The inputted data are stored in the memory 52.

(Action of Post-cure Inflator 100: Expansion Cooling Processing Routine)

Figure 6:
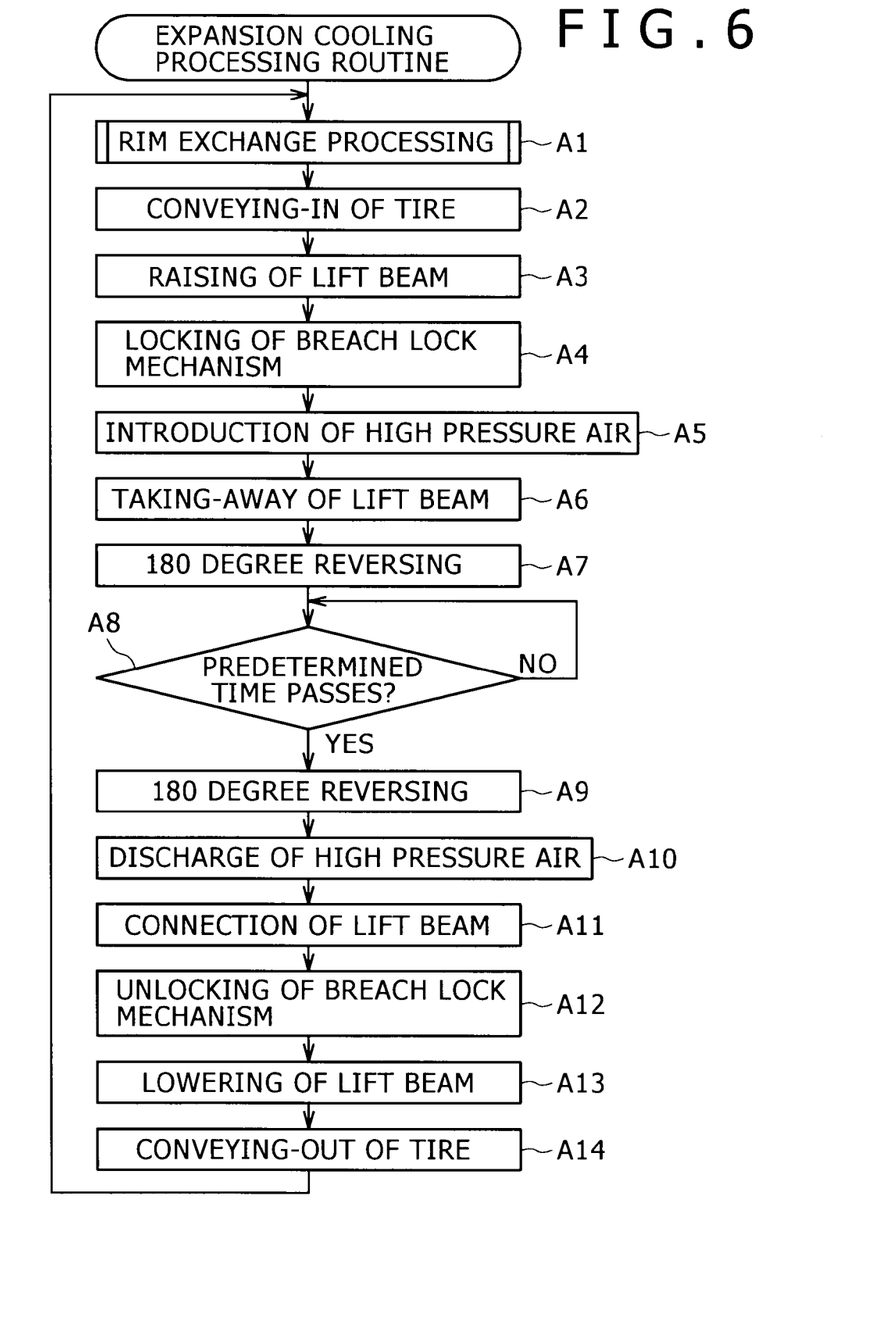
FIG. 6 is a flowchart of an expansion cooling processing routine.

Next, a description will be given to the expansion cooling processing routine serving as an action of the expansion cooling by the post-cure inflator 100 with using FIG. 6.

Firstly, the post-cure inflator 100 stands by without the tire in a state that the lift beam 2 is lowered (refer to FIG. 2). Here, the lower part of the lock member 4 and the upper part of the locking shaft 14 are apart from each other. It should be noted that the upper rim A is fixed to the upper rim support 3 unlike FIG. 2. Then, rim exchange processing is performed (A1). The rim exchange processing will be described later.

Then, the vulcanized tire T1 is disposed on the lower rim B by the conveyance device C (A2). Next, the lift beam 2 is raised to a predetermined position (a position where there is a slight clearance between a front end of the locking shaft 14 and an upper surface of a hole of the lock member 4) (A3) (refer to FIG. 3). It should be noted that the upper rim A is fixed to the upper rim support 3 unlike FIG. 3. The lock member 4 is rotated by a predetermined angle, and the lower part of the lock member 4 and the upper part of the locking shaft 14 are locked by the breach lock mechanism (A4). Thereby, the bead portions t1 and t2 of the tire T1 are sandwiched by a pair of the rims A and B.

Here, in the case where a pair of the rims A and B is supported in the arrangement in which the one rim surfaces s1 face each other, it is possible to sandwich the tire with the bead diameter corresponding to any of the step portions of the one rim surface s1. Meanwhile, in the case where a pair of the rims A and B is supported in the arrangement in which the other rim surfaces s2 face each other, it is possible to sandwich the tire with the bead diameter corresponding to any of the step portions of the other rim surface s2. As mentioned above, a plurality of the step portions corresponding to the bead portions of different bead diameters are formed on the one rim surface s1 and the other rim surface s2 of the rim respectively. The bead diameter to be treated is added by appropriately using the one rim surface s1 and the other rim surface s2. Thereby, in comparison to the case where a number of step portions are provided in only one side of the rim so as to add the bead diameter to be treated, it is possible to have wider width of the step portions and surely seal the bead portions of the tire. Alternatively, a plurality of the step portions corresponding to the bead portions of different bead diameters are formed on the one rim surface s1 and the other rim surface s2 of the rim so as to add the bead diameter to be treated. Thereby, in comparison to the case where a number of step portions are provided in only one side of the rim so as to add the bead diameter to be treated, it is possible to sufficiently bring the step portions with a large bead diameter of a pair of the rims A and B closer to each other. Therefore, it is possible to favorably sandwich the tire even when the bead diameter to be treated is added.

After A4, the high pressure air is introduced from the supply pipe 8 to the inside of the tire Ti so that the expansion cooling is started (A5). The lift beam 2 is pushed down by generative force of the internal pressure due to the introduction of the high pressure air, and the locking shaft 14 and the lock member 4 are set in a state shown in FIG. 1.

Next, since the lock plate 32 is removed by the lower cylinder 31 and only the lift beam 2 is further lowered by the lift beam cylinder 34, the lift beam 2 is taken away from the nut receiving material 22 (A6). Thereby, the post-cure inflator 100 can be reversed by 180 degrees around the center frame 1. By reversing by 180 degrees around the center frame 1, a pair of the rims A and B with which the expansion cooling is currently performed are positioned on the upper side of the center frame 1 and the other pair of the rims A and B with which the expansion cooling is performed on the upper side of the center frame 1 is positioned on the lower side of the center frame 1 (A7).

While the tire to which the expansion cooling is completed is detached from the other pair of the rims A and B positioned on the lower side of the center frame 1, the expansion cooling is continued with a pair of the rims A and B positioned on the upper side of the center frame 1. Then, it is determined whether or not a predetermined time passes (A8). In the case where it is determined that the predetermined time does not yet pass (A8: NO), A8 is repeated so as to wait for the predetermined time passing. In the case where it is determined that the predetermined time already passes (A8: YES), by reversing by 180 degrees around the center frame 1, a pair of the rims A and B with which the expansion cooling is finished on the upper side of the center frame 1 are positioned on the lower side of the center frame 1 (A9).

A supply valve is switched and the high pressure air in the tire T1 is discharged from the supply pipe 8 (A10). Then, the lift beam 2 is raised to an upper limit, and the lift beam 2 and the nut receiving material 22 are locked by the lock plate 32 (A11). The lock member 4 is rotated, and the breach lock mechanism for the locking shaft 14 and the lock member 4 is set in an unlocked state (A12). The lift beam 2 is lowered while the tire T1 is disposed on the lower rim B (A13). Then, the tire T to which the expansion cooling is finished is conveyed to the exterior by the conveyance device C (A14). Then, the flow returns to A1.

(Action of Post-cure Inflator 100: Rim Exchange Processing Routine)

Figure 7:
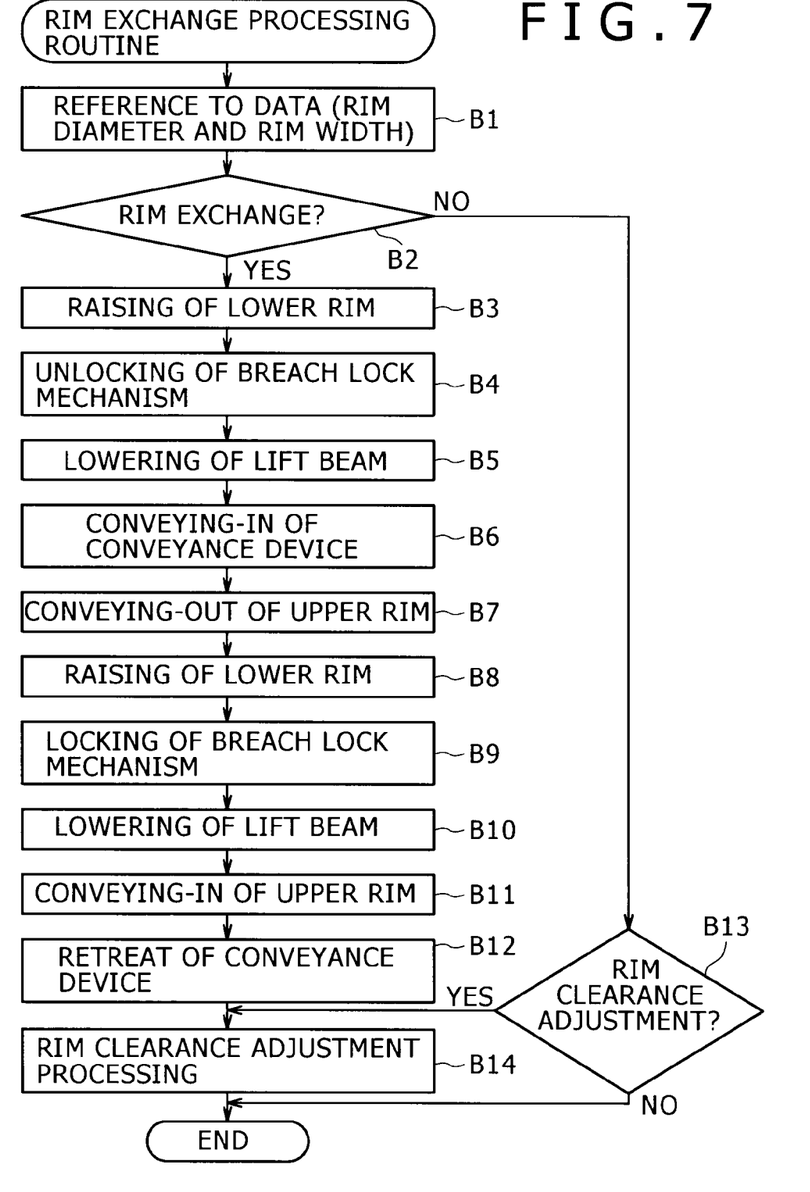
FIG. 7 is a flowchart of a rim exchange processing routine.

Next, a description will be given to the rim exchange processing of A1 of FIG. 6 with using the rim exchange processing routine of FIG. 7. This rim exchange processing routine is executed by a command from the exterior. By referring to data (the bead diameter and the bead width) of a tire to which the expansion cooling is newly performed, rim exchange and adjustment of the rim clearance are performed according to needs. It should be noted that a description will be given to the case where the bead diameter of even-numbered size is exchanged to the bead diameter of odd-numbered size, that is, the case where the upper rim A already attached to the upper side is attached to the lower side and the lower rim B already attached to the lower side is attached to the upper side. However, the opposite exchange can be performed.

Firstly, the upper rim A is fixed to the upper rim support 3 by the lock ring 5 in a state that the post-cure inflator 100 does not hold the tire. Meanwhile, the lower rim B is fixed to the lower rim support 16 by the permanent magnets 26. In this state, the data (the bead diameter and the bead width) of the tire to which the expansion cooling is newly performed are referred as shown in FIG. 7 (B1). It is determined whether or not the rim exchange is performed (B2). In the case where it is determined that the rim exchange is performed due to the fact that the bead diameter of the even-numbered inches is changed to the bead diameter of the odd-numbered inches or vice versa (B2: YES), the lift beam 2 is raised by the guide mechanism 43 and the lower rim support 16 is raised so that the lower rim B is raised until an upper surface of the lower rim B is brought in contact with a lower surface of the upper rim A (B3) (refer to FIG. 3). At this time, it is possible to stop the gear motor 25 for rotating the adjustment nut 19 by detecting an overload due to the contact between the upper rim A and the lower rim B. It is also possible to stop the gear motor 25 by detecting the fact that the lower rim B is positioned at a preliminarily set position. Thereby, when the concave portion a3 of the upper rim A and the convex portion b2 of the lower rim B are fitted with each other and the upper rim A is detached from the lock ring 5, a pair of the rims A and B is retained in a stabilized state (not shown).

Next, the breach lock mechanism for the lock ring 5 and the upper rim A is set in an unlocked state (B4). In a state that a pair of the rims A and B is disposed on the lower rim support 16, the lift beam 2 is lowered to the lowest point (B5) (refer to FIG. 2). Then, the conveyance device C is conveyed onto the upper rim A (B6). The upper rim A is conveyed to a position which is away from a rim center line D (a position where a pair of the rims A and B is not overlapped in the up and down direction) by the conveyance device C (B7). Then, in a state that the lower rim B is fixed to the lower rim support 16, the lift beam 2 is raised to the highest point by the guide mechanism 43 again and the lower rim support 16 is also raised so that the lower rim B is raised until the protrusion b1 of the lower rim B is brought in contact with the upper rim support 3 (B8) (refer to FIG. 2).

Next, the lock ring 5 is rotated in the locking direction and the breach lock mechanism for the lock ring 5 and the lower rim B is set in a locked state (B9). Then, the lift beam 2 is lowered to the lowest point by the guide mechanism 43 (B10) (refer to FIG. 4). At this time, there is a need for lowering the lift beam 2 so as to overcome the absorption force of the permanent magnets 26 for fixing the lower rim B and the lower rim support 16. However, since the weight of the rim and the like also work in the direction of drawing away from the permanent magnets 26, there is no need for large force.

Next, the upper rim A already conveyed to the exterior by the conveyance device C is conveyed into the same position as the rim center line D of the post-cure inflator 100, the conveyance device C is lowered and the upper rim A is disposed on the lower rim support 16 (B11). When the upper rim A is released from the conveyance device C, the upper rim A is fixed onto the lower rim support 16 by the absorption force of the permanent magnets 26. Then, the conveyance device C is retreated to the outside of the rim center line D (the outside of the machine) (B12).

In the case where it is determined that the rim exchange is not performed in B2 (B2: NO), it is determined whether or not the rim clearance is adjusted (B13). In the case where it is determined that the rim clearance is adjusted in B13 (B13: YES), or after B12, rim clearance adjustment processing is performed (B14).

That is, in FIG. 1, firstly, in a state that the nut receiving material 22 is fixed in the rotational direction and the axial direction by the lock plate 32, the gear motor 25 is driven and the adjustment nut 19 is rotated through the pinion 24 and the spur gear 20. At this time, since movement of the adjustment nut 19 in the axial direction is regulated by the pressing plate 23, only rotational movement is performed. When the adjustment nut 19 is rotated, the lower rim support 16 whose rotation is regulated by the slide pin 21 and screwed into the adjustment nut 19 is raised and lowered in the axial direction. It should be noted that at this time, since the coupling shaft 17 is coupled to the nut receiving material 22 by the spring pin 30, the coupling shaft 17 is not rotated. The locking shaft 14 connected to the coupling shaft 17 by the pin 18 is also not rotated. The rim clearance between a pair of the rims A and B is adjusted by raising and lowering this lower rim support 16.

As mentioned above, since the rim clearance between a pair of the rims A and B is automatically adjusted, it is possible to reduce a burden due to a rim clearance adjustment operation and shorten loss time required for the rim clearance adjustment operation.

In the case where it is determined that the rim clearance is not adjusted in B13 (B13: NO), or after B14, the present routine is finished and the flow returns to the expansion cooling processing routine in FIG. 6.

As mentioned above, the rim attached to the lower rim support 16 is guided to the upper rim support 3 from which the other rim is detached by the guide mechanism 43. Thereby, the up and down relationship between a pair of the rims A and B can be switched by the procedure of detaching the other rim from the upper rim support 3, guiding the rim attached to the lower rim support 16 to the upper rim support 3 by the guide mechanism 43, detaching this from the lower rim support 16 and attaching this to the upper rim support 3, and attaching the other rim already detached from the upper rim support 3 to the lower rim support 16 which is empty.

The first attachment and detachment mechanism (the breach lock mechanism) 41, the second attachment and detachment mechanism 44 and the conveyance device C are controlled by the control device 50. Thereby, the rim detached from the upper rim support 3 by the first attachment and detachment mechanism 41 is conveyed to the exterior by the conveyance device C. Then, the other rim already attached to the lower rim support 16 is guided to the upper rim support 3 by the guide mechanism 43, attached to the upper rim support 3 by the first attachment and detachment mechanism 41 and detached from the lower rim support 16 by the second attachment and detachment mechanism 44. The rim already conveyed to the exterior is conveyed to the lower rim support 16 which is empty by the conveyance device C and attached to the lower rim support 16 by the second attachment and detachment mechanism 44. Therefore, it is possible to automatically perform an operation of changing a pair of the rims A and B from the arrangement in which the one rim surfaces s1 face each other to the arrangement in which the other rim surfaces s2 face each other or vice versa.

It is also possible to surely and easily perform the detachment of the rim from the upper rim support 3 and the attachment of the rim to the upper rim support 3 by the breach lock mechanism 41. Further, it is possible to surely and easily perform the detachment of the rim from the lower rim support 16 and the attachment of the rim to the lower rim support 16 by utilizing the absorption force of the permanent magnets 26.

(Summary of the Present Embodiment)

As mentioned above, the post-cure inflator 100 of the present embodiment is the post-cure inflator 100 for performing the expansion cooling to the vulcanized tire T1 or T2 having the bead portions t1 and t2 of various bead diameters and bead width, including a pair of the disk shape rims A and B having the rim surfaces for sandwiching the bead portions t1 and t2 on both sides, and the rim support mechanism 40 for detachably supporting a pair of the rims A and B, wherein a plurality of the step portions corresponding to the bead portions t1 and t2 of different bead diameters are formed on the one rim surface s1 and the other rim surface s2 of the rim so as to reduce the thickness from the center to the outer periphery, and the rim support mechanism 40 supports a pair of the rims A and B switchably between the arrangement in which the one rim surfaces s1 face each other and the arrangement in which the other rim surfaces s2 face each other.

According to the above configuration, a pair of the rims A and B for sandwiching the bead portions t1 and t2 of the tire T1 or T2 are supported switchably between the arrangement in which the one rim surfaces s1 face each other and the arrangement in which the other rim surfaces s2 face each other. In the case where a pair of the rims A and B is supported in the arrangement in which the one rim surfaces s1 face each other, it is possible to sandwich the tire with the bead diameter corresponding to any of the step portions of the one rim surface s1. Meanwhile, in the case where a pair of the rims A and B is supported in the arrangement in which the other rim surfaces s2 face each other, it is possible to sandwich the tire with the bead diameter corresponding to any of the step portions of the other rim surface s2. As mentioned above, a plurality of the step portions corresponding to the bead portions t1 and t2 of different bead diameters are formed on the one rim surface s1 and the other rim surface s2 of the rim respectively. The bead diameter to be treated is added by appropriately using the one rim surface s1 and the other rim surface s2. Thereby, in comparison to the case where a number of step portions are provided in only one side of the rim so as to add the bead diameter to be treated, it is possible to have wider width of the step portions and surely seal the bead portions t1 and t2 of the tire T1 or T2. Alternatively, a plurality of the step portions corresponding to the bead portions t1 and t2 of different bead diameters are formed on the one rim surface s1 and the other rim surface s2 of the rim so as to add the bead diameter to be treated. Thereby, in comparison to the case where a number of step portions are provided in only one side of the rim so as to add the bead diameter to be treated, it is possible to sufficiently bring the step portions with a large bead diameter of a pair of the rims A and B closer to each other. Therefore, it is possible to favorably sandwich the tire even when the bead diameter to be treated is added.

In the post-cure inflator 100 of the present embodiment, the rim support mechanism 40 has the first attachment member (the upper rim support 3) to which the one rim is attached, the second attachment member (the lower rim support 16) to which the other rim is attached, and further, the guide mechanism 43 (the lift beam cylinder 34, the adjustment nut 19, the spur gear 20, the pinion 24, the gear motor 25 and the like) for guiding the other rim attached to the second attachment member to the first attachment member from which the one rim is already detached. According to the above configuration, the other rim attached to the second attachment member is guided to the first attachment member from which the one rim is already detached by the guide mechanism 43. Thereby, the up and down relationship between a pair of the rims A and B can be switched by the procedure of detaching the one rim from the first attachment member, guiding the other rim attached to the second attachment member to the first attachment member by the guide mechanism 43, detaching this from the second attachment member and attaching this to the first attachment member, and attaching the one rim to the second attachment member which is empty. Therefore, it is possible to change a pair of the rims A and B from the arrangement in which the one rim surfaces s1 face each other to the arrangement in which the other rim surfaces s2 face each other or vice versa without reversing the rims.

The post-cure inflator 100 of the present embodiment further has the first attachment and detachment mechanism 41 (the lock ring 5, the upper cylinder 6 and the like) for detaching the one rim attached to the first attachment member while attaching the other rim to the first attachment member which is empty, the second attachment and detachment mechanism 44 (the permanent magnets 26, the lift beam cylinder 34, the adjustment nut 19, the spur gear 20, the pinion 24, the gear motor 25 and the like) for detaching the other rim attached to the second attachment member while attaching the one rim to the second attachment member which is empty, the conveyance device C for conveying the one rim already detached from the first attachment member to the exterior and conveying the one rim already conveyed to the exterior to the second attachment member which is empty, and the control device 50 for controlling the first attachment and detachment mechanism 41, the second attachment and detachment mechanism 44 and the conveyance device C. According to the above configuration, the first attachment and detachment mechanism 41, the second attachment and detachment mechanism 44 and the conveyance device C are controlled by the control device 50. Thereby, the one rim detached from the first attachment member by the first attachment and detachment mechanism 41 is conveyed to the exterior by the conveyance device C. Then, the other rim attached to the second attachment member is guided to the first attachment member by the guide mechanism 43. Thereby, the detachment from the second attachment member by the second attachment and detachment mechanism 44 and the attachment to the first attachment member by the first attachment and detachment mechanism 41 are performed. The one rim already conveyed to the exterior is conveyed to the second attachment member which is empty by the conveyance device C and attached to the second attachment member by the second attachment and detachment mechanism 44. Therefore, it is possible to automatically perform an operation of changing a pair of the rims A and B from the arrangement in which the one rim surfaces s1 face each other to the arrangement in which the other rim surfaces s2 face each other or vice versa.

In the post-cure inflator 100 of the present embodiment, the first attachment and detachment mechanism 41 is the breach lock mechanism 41. According to the above configuration, it is possible to surely and easily perform the detachment of the rims from the first attachment member and the attachment of the rims to the first attachment member by the breach lock mechanism 41.

In the post-cure inflator 100 of the present embodiment, the second attachment and detachment mechanism 44 has the permanent magnets 26. According to the above configuration, it is possible to surely and easily perform the detachment of the rims from the second attachment member and the attachment of the rims to the second attachment member by utilizing the absorption force of the permanent magnets 26.

The post-cure inflator 100 of the present embodiment further has the clearance adjustment mechanism 42 (the adjustment nut 19, the spur gear 20, the pinion 24, the gear motor 25 and the like) for adjusting the clearance between a pair of the rims A and B, and the clearance adjustment control device (the control device 50) for controlling the clearance adjustment mechanism 42. According to the above configuration, since the clearance between a pair of the rims A and B is automatically adjusted by the clearance adjustment mechanism 42 controlled by the clearance adjustment control device, it is possible to simplify the rim clearance adjustment operation.

A rim exchange method of the post-cure inflator of the present embodiment is a rim exchange method of the post-cure inflator 100 for performing the expansion cooling to the vulcanized tire T1 or T2 having the bead portions t1 and t2 of various bead diameters and bead width by sandwiching the bead portions t1 and t2 with a pair of the disk shape rims A and B having the rim surfaces on both sides, wherein a pair of the rims A and B in which a plurality of the step portions corresponding to the bead portions t1 and t2 of different bead diameters are respectively formed on the one rim surface s1 and the other rim surface s2 so as to reduce the thickness from the center to the outer periphery are supported switchably between the arrangement in which the one rim surfaces s1 face each other and the arrangement in which the other rim surfaces s2 face each other, the one rim attached to the first attachment member (the upper rim support 3) is detached and conveyed to the exterior, the other rim attached to the second attachment member (the lower rim support 16) is guided to the first attachment member so as to perform the detachment from the second attachment member and the attachment to the first attachment member, and by attaching the one rim already conveyed to the exterior to the second attachment member which is empty, the arrangement in which the one rim surfaces s1 face each other is changed to the arrangement in which the other rim surfaces s2 face each other or vice versa.

According to the above configuration, a pair of the rims A and B for sandwiching the bead portions t1 and t2 of the tire T1 or T2 are supported switchably between the arrangement in which the one rim surfaces s1 face each other and the arrangement in which the other rim surfaces s2 face each other. In the case where a pair of the rims A and B is supported in the arrangement in which the one rim surfaces s1 face each other, it is possible to sandwich the tire with the bead diameter corresponding to any of the step portions of the one rim surface s1. Meanwhile, in the case where a pair of the rims A and B is supported in the arrangement in which the other rim surfaces s2 face each other, it is possible to sandwich the tire with the bead diameter corresponding to any of the step portions of the other rim surface s2. As mentioned above, a plurality of the step portions corresponding to the bead portions t1 and t2 of different bead diameters are formed on the one rim surface s1 and the other rim surface s2 of the rim respectively. And the bead diameter to be treated is added by appropriately using the one rim surface s1 and the other rim surface s2. Thereby, in comparison to the case where a number of step portions are provided in only one side of the rim so as to add the bead diameter to be treated, it is possible to have wider width of the step portions and surely seal the bead portions t1 and t2 of the tire T1 or T2. Alternatively, a plurality of the step portions corresponding to the bead portions t1 and t2 of different bead diameters are formed on the one rim surface s1 and the other rim surface s2 of the rim so as to add the bead diameter to be treated. Thereby, in comparison to the case where a number of step portions are provided in only one side of the rim so as to add the bead diameter to be treated, it is possible to sufficiently bring the step portions with a large bead diameter of a pair of the rims A and B closer to each other. Therefore, it is possible to favorably sandwich the tire even when the bead diameter to be treated is added.

The up and down relationship between a pair of the rims A and B can be switched by the procedure of detaching the one rim from the first attachment member and conveying the one rim to the exterior, guiding the other rim attached to the second attachment member to the first attachment member, performing the detachment from the second attachment member and the attachment to the first attachment member, and attaching the one rim already conveyed to the exterior to the second attachment member which is empty. Therefore, it is possible to change a pair of the rims A and B from the arrangement in which the one rim surfaces s1 face each other to the arrangement in which the other rim surfaces s2 face each other or vice versa without reversing the rims.

The rim of the present embodiment is the rim (the upper rim A or the lower rim B) to be attached to either the first attachment member (the upper rim support 3) or the second attachment member (the lower rim support 16) provided in the post-cure inflator 100 for performing the expansion cooling to the vulcanized tire T1 or T2 having the bead portions t1 and t2 of various bead diameters and bead width and to be formed into a disk shape having the rim surfaces abutted to the bead portions t1 and t2 on both sides, having the one rim surface s1 and the other rim surface s2 on which a plurality of the step portions corresponding to the bead portions t1 and t2 of different bead diameters are formed so as to reduce the thickness from the center to the outer periphery, the first engagement portion (the hole provided in the protrusion a1 or b1) engaged with the first attachment member and the second engagement portion (the hole provided in the protrusion a1 or b1) engaged with the second attachment member.

According to the above configuration, the rim having the one rim surface s1 and the other rim surface s2 is attached to either the first attachment member or the second attachment member provided in the post-cure inflator 100. In the case where a pair of the rims A and B is attached to the post-cure inflator 100 so as to have the arrangement in which the one rim surfaces s1 face each other, it is possible to sandwich the tire with the bead diameter corresponding to any of the step portions of the one rim surface s1. Meanwhile, in the case where a pair of the rims A and B is attached to the post-cure inflator 100 so as to have the arrangement in which the other rim surfaces s2 face each other, it is possible to sandwich the tire with the bead diameter corresponding to any of the step portions of the other rim surface s2. As mentioned above, a plurality of the step portions corresponding to the bead portions t1 and t2 of different bead diameters are formed on the one rim surface s1 and the other rim surface s2 of the rim respectively. The bead diameter to be treated is added by appropriately using the one rim surface s1 and the other rim surface s2. Thereby, in comparison to the case where a number of step portions are provided in only one side of the rim so as to add the bead diameter to be treated, it is possible to have wider width of the step portions and surely seal the bead portions t1 and t2 of the tire T1 or T2. Alternatively, a plurality of the step portions corresponding to the bead portions t1 and t2 of different bead diameters are formed on the one rim surface s1 and the other rim surface s2 of the rim so as to add the bead diameter to be treated. Thereby, in comparison to the case where a number of step portions are provided in only one side of the rim so as to add the bead diameter to be treated, it is possible to sufficiently bring the step portions with a large bead diameter of a pair of the rims A and B closer to each other. Therefore, it is possible to favorably sandwich the tire even when the bead diameter to be treated is added.

The post-cure inflator 100 of the present embodiment has the first attachment member (the upper rim support 3) and the second attachment member (the lower rim support 16) to which the rim is attached respectively, and the first attachment member and the second attachment member support a pair of the rims A and B switchably between the arrangement in which the one rim surfaces s1 face each other and the arrangement in which the other rim surfaces s2 face each other.

According to the above configuration, a pair of the rims A and B for sandwiching the bead portions t1 and t2 of the tire T1 or T2 are supported switchably between the arrangement in which the one rim surfaces s1 face each other and the arrangement in which the other rim surfaces s2 face each other. In the case where a pair of the rims A and B is supported in the arrangement in which the one rim surfaces s1 face each other, it is possible to sandwich the tire with the bead diameter corresponding to any of the step portions of the one rim surface s1. Meanwhile, in the case where a pair of the rims A and B is supported in the arrangement in which the other rim surfaces s2 face each other, it is possible to sandwich the tire with the bead diameter corresponding to any of the step portions of the other rim surface s2. As mentioned above, by using the rim in which a plurality of the step portions corresponding to the bead portions t1 and t2 of different bead diameters are formed on the one rim surface s1 and the other rim surface s2, in comparison to the case of using a rim in which the same number of step portions as the sum of the number of the step portions in the one rim surface s1 and the number of the step portions in the other rim surface s2 are provided in only one side, it is possible to surely seal the bead portions t1 and t2 of the tire T1 or T2. Alternatively, by using the rim in which a plurality of the step portions corresponding to the bead portions t1 and t2 of different bead diameters are formed on the one rim surface s1 and the other rim surface s2, in comparison to the case of using a rim in which the same number of step portions as the sum of the number of the step portions in the one rim surface s1 and the number of the step portions in the other rim surface s2 are provided in only one side, it is possible to sufficiently bring the step portions with a large bead diameter of a pair of the rims A and B closer to each other. Therefore, it is possible to favorably sandwich the tire even with a large diameter and narrow bead width.

(Variation Example of the Present Embodiment)

An example of the present invention is described above. However, only a specific example is shown and the present invention is not particularly limited. A specific configuration can be properly set and changed. Operations and effects described in the embodiment of the invention are only the most preferred operations and effects generated from the present invention. Operations and effects according to the present invention are not limited to the operations and effects described in the embodiment of the invention.

For example, in the present embodiment, the step portions of the one rim surface s1 correspond to the bead diameters of the even-numbered inches and the step portions of the other rim surface s2 correspond to the bead diameters of the odd-numbered inches. However, the present invention is not limited to this configuration, and for example the step portions of the one rim surface s1 may correspond to the bead diameters of 12, 15 and 18 inches formed at three inch intervals and the step portions of the other rim surface s2 may correspond to the bead diameters of 13, 16 and 19 inches formed at three inch intervals. Although the step portions of the one rim surface s1 and the step portions of the other rim surface s2 are respectively formed with four steps, the number of steps may be more than four or less than four.

I claim:

1. A post-cure inflator for performing expansion cooling to vulcanized tires having bead portions of various bead diameters and bead widths, comprising:
   a pair of disk shape rims, each rim of the pair of said rims having rim surfaces for sandwiching the bead portions of the tires on both sides of the rim, whereby each rim of the pair of said rims has one rim surface on one side of the rim and an other rim surface on an other side of the rim; and
   a rim support mechanism for detachably supporting the pair of said rims, wherein
   said rim support mechanism supports the pair of said rims switchably between an arrangement in which the one rim surfaces face each other and an arrangement in which the other rim surfaces face each other, and
   in at least one rim of the pair of said rims, a plurality of step portions corresponding to the bead portions of tires having different bead diameters are formed on the one rim surface and on the other rim surface, the step portions being arranged such that the thickness of the rim is reduced from a center of the rim to an outer periphery of the rim.

2. The post-cure inflator according to claim 1, wherein said rim support mechanism comprises:
   a first attachment member to which one rim of the pair of said rims is attached;
   a second attachment member to which the other rim of the pair of said rims is attached; and
   a guide mechanism for guiding the other rim attached to said second attachment member to said first attachment member from which the one rim is already detached.

3. The post-cure inflator according to claim 2, further comprising:
   a first attachment and detachment mechanism for detaching the one rim attached to said first attachment member while attaching the other rim to said first attachment member which is empty;
   a second attachment and detachment mechanism for detaching the other rim attached to said second attachment member while attaching the one rim to said second attachment member which is empty;
   a conveyance device for conveying the one rim already detached from said first attachment member to an exterior of the post-cure inflator and conveying the one rim, already conveyed to the exterior of the post-cure inflator, to said second attachment member which is empty; and
   a control device for controlling said first attachment and detachment mechanism, said second attachment and detachment mechanism, and said conveyance device.

4. The post-cure inflator according to claim 3, wherein said first attachment and detachment mechanism is a breach lock mechanism.

5. The post-cure inflator according to claim 3, wherein said second attachment and detachment mechanism has a permanent magnet.

6. The post-cure inflator according to claim 1, further comprising:
   a clearance adjustment mechanism for adjusting a clearance between the pair of said rims; and
   a clearance adjustment control device for controlling said clearance adjustment mechanism.

7. The post-cure inflator according to claim 2, wherein said at least one rim has one of a first engagement portion engaged with said first attachment member and a second engagement portion engaged with said second attachment member.

8. A rim exchange method of a post-cure inflator for performing expansion cooling to vulcanized tires having bead portions of various bead diameters and bead widths by sandwiching the bead portions with a pair of disk shape rims each having rim surfaces on both sides of the rim, whereby each rim of the pair of said rims has one rim surface on one side of the rim and an other rim surface on an other side of the rim, wherein the pair of the rims is formed by two rims in which each rim of the pair of the rims has a plurality of step portions corresponding to the bead portions of tires of different bead diameters respectively formed on the one rim surface and on the other rim surface so as to reduce the thickness of the rim from a center of the rim to an outer periphery of the rim, the pair of the rims being supported switchably between an arrangement in which the one rim surfaces face each other and an arrangement in which the other rim surfaces face each other, the method comprising the steps of:
   detaching one rim attached to a first attachment member and conveying the detached one rim to an exterior of the post-cure inflator;
   guiding the other rim attached to a second attachment member to the first attachment member so as to perform detachment from the second attachment member and attachment to the first attachment member; and
   attaching the one rim already conveyed to the exterior of the post-cure inflator to the second attachment member which is empty so as to change the arrangement in which the one rim surfaces face each other to the arrangement in which the other rim surfaces face each other or vice versa.

9. A rim of a post-cure inflator to be attached to either a first attachment member or a second attachment member provided in the post-cure inflator for performing expansion cooling to vulcanized tires having bead portions of various bead diameters and bead widths, the rim having a disk shape comprising opposite rim surfaces to be abutted to the bead portions on both sides, the opposite rim surfaces including one rim surface and an other rim surface in which a plurality of step portions corresponding to the bead portions of tires having different bead diameters are formed, the step portions being arranged so as to reduce the thickness of the rim from a center of the rim to an outer periphery of the rim, and having a first engagement portion engaged with the first attachment member and a second engagement portion engaged with the second attachment member.

* * * * *